United States Patent
Domoto et al.

(10) Patent No.: US 7,628,517 B2
(45) Date of Patent: Dec. 8, 2009

(54) VEHICLE HEADLIGHT ASSEMBLY AND MOTORCYCLE UTILIZING THE SAME

(75) Inventors: Mikio Domoto, Kakogawa (JP); Katsushi Ono, Tokyo (JP)

(73) Assignees: Kawasaki Jukogyo Kabushiki Kaisha, Hyogo (JP); Stanley Electric CO., Ltd., Tokyo (JP)

( * ) Notice: Subject to any disclaimer, the term of this patent is extended or adjusted under 35 U.S.C. 154(b) by 27 days.

(21) Appl. No.: 11/520,151

(22) Filed: Sep. 13, 2006

(65) Prior Publication Data

US 2007/0058381 A1 Mar. 15, 2007

(30) Foreign Application Priority Data

Sep. 15, 2005 (JP) ............................. 2005-269270

(51) Int. Cl.
*B62J 6/00* (2006.01)

(52) U.S. Cl. ........................ 362/475; 362/473; 362/476; 362/543; 362/544; 362/548; 362/549; 362/249; 362/252

(58) Field of Classification Search ........................ None
See application file for complete search history.

(56) References Cited

U.S. PATENT DOCUMENTS

| | | | | |
|---|---|---|---|---|
| 5,190,368 A | * | 3/1993 | Sekiguchi | 362/539 |
| 6,439,753 B1 | * | 8/2002 | Sumada et al. | 362/475 |
| 6,758,589 B2 | * | 7/2004 | Hayakawa et al. | 362/539 |
| 6,840,661 B2 | * | 1/2005 | Desjardins | 362/545 |
| 6,957,903 B2 | * | 10/2005 | Arakawa et al. | 362/545 |
| 2005/0270792 A1 | * | 12/2005 | Suzuki | 362/517 |

FOREIGN PATENT DOCUMENTS

JP 06-103801 4/1994

* cited by examiner

*Primary Examiner*—Sandra L O'Shea
*Assistant Examiner*—Danielle Allen

(57) ABSTRACT

To provide a vehicle headlight assembly designed to increase the productivity, the vehicle headlight assembly includes a light projecting group (34) accommodated within a casing (31) and including a plurality of light projecting units (29, 30). Each of the light projecting units (29, 30) in turn includes a light emitting element (37, 38), and a support member (40A, 40B) supported by and within the casing (31). The support members (40A, 40B) of each light projecting units (29, 30) cooperatively form a single holder (40A, 40B).

20 Claims, 6 Drawing Sheets

VEHICLE HEADLIGHT ASSEMBLY AND MOTORCYCLE UTILIZING THE SAME

BACKGROUND OF THE INVENTION

1. Field of the Invention

The present invention relates to a vehicle headlight assembly having a plurality of light emitting elements and a motorcycle utilizing the same.

2. Description of the Prior Art

The Japanese Laid-open Patent Publication No. 6-103801, published Apr. 15, 1964, for example, discloses a motor cycle headlight assembly including a plurality of headlights, which are supported by a lamp casing by means of respective holders.

In this prior art headlight assembly, it has been found that four separate holders are required where the headlight assembly is desired to be of a four light system, including four headlights (light projecting units) two on each side of a vehicle, for example, a motorcycle. Thus, the prior art headlight assembly has a problem in that not only is the number of component parts increased, but the number of assembling steps for assembling the individual headlights to respective lamp casings is also increased, resulting in lowering of the productivity. On the other hand, the headlight assembly itself would become so bulky and so heavy particularly where it is used on a large size motor vehicle that the handling thereof would not be easy and, therefore, not only is assemblage onto the motor vehicle difficult, but the productivity is also lowered.

SUMMARY OF THE INVENTION

In view of the foregoing, the present invention has been devised to substantially eliminate the problems and inconveniences inherent in the prior art headlight assembly and has for its primary object to provide an improved headlight assembly for a motor vehicle designed to increase the productivity and, also, a motorcycle utilizing such headlight assembly.

In order to accomplish the foregoing object, the present invention according to a first aspect thereof provides a vehicle headlight assembly, which includes a casing and a light projecting group accommodated within the casing and including a plurality of light projecting units. Each of the light projecting units in turn includes a light emitting element, a projector lens and a support member supported by and within the casing and operable to support the projector lens. The support members of those light projecting units cooperatively form a single holder.

According to the present invention, since the plural support members of the light projecting units are constituted by the single holder, the plural light projecting units can be supported by the casing by the utilization of the single holder and, therefore, not only can the assimilability of the headlight assembly be increased, but the number of component parts used can also be reduced. Also, since in this headlight assembly, a tilting motion of the single holder allows the respective optical axes of the plural light projecting units to be adjusted simultaneously, the adjustment of the optical axes of those light projecting units can easily be accomplished.

In a preferred embodiment of the present invention, the light projecting units forming the light projecting group may be arranged displaced relative to each other in a direction along an optical axis. This is particularly advantageous in that if the plural light projecting units are arranged displaced in one or both of a direction conforming to the longitudinal sense of a motor vehicle and a direction conforming to the widthwise direction of the motor vehicle, the dimension of the headlight assembly as a whole as measured in a direction perpendicular to the direction of the optical axis, for example, the width of the headlight assembly can be reduced to facilitate compactization of the headlight assembly.

In another preferred embodiment of the present invention, a light shielding member may be employed for partially shielding a cone of rays of light projected from the light emitting element to adjust a region to be illuminated, and may be formed integrally with the holder. This structural feature is effective to reduce the number of component parts used and, also, the number of assembling steps as compared with the use of a light shielding member separate from the holder.

In a further preferred embodiment of the present invention, the headlight assembly may include first and second lamp units connected with each other, in which case the light projecting group is provided within each of those lamp units.

The present invention in accordance with a second aspect thereof also provides a vehicle headlight assembly which includes a plurality of lamp units connected separably with each other and each of those lamp units may include one or more light projecting units each having a light emitting element.

According to the second aspect of the present invention, as compared with the unitary structure of a plurality of lamp units formed integrally with each other, each of the lamp units can have a reduced weight, allowing the individual lamp units to be handled easily and, hence, facilitating assemblage onto the motor vehicle. In particular, where a relatively heavy projector lamp is used for the light projecting unit, the effect of increase of the assimilability resulting from reduction in weight discussed above is indeed prominent.

Each of the lamp units referred to above may preferably have a coupling piece having a connecting hole defined therein, in which case the coupling pieces of those lamp units are connected with each other and concurrently supported by a fairing that covers an area forwardly of a vehicle by means of a connecting member, which has been passed through the respective connecting holes of the coupling pieces. This is particularly advantageous in that since the coupling pieces concurrently serve to position the lamp units relative to each other by connecting with each other and also to connect the both with the fairing, the number of connecting elements to be provided in the lamp units for connection with the fairing can be reduced. Accordingly, not only can the assimilability be increased, but the space required for those joints can be minimized.

The present invention in accordance with a third aspect thereof furthermore provides a motorcycle which includes a fairing mounted at a front portion of the motorcycle and a headlight assembly mounted on the fairing.

This headlight assembly includes a plurality of lamp units connected separably with each other, each of the lamp units including one or more light projecting units each having a light emitting element.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

In the accompanying drawings, like reference numerals are used to denote like parts throughout the several views, and.

DETAILED DESCRIPTION OF THE EMBODIMENTS

Hereinafter, a preferred embodiment of the present invention will be described in detail with reference to the accompanying drawings.

Figure 1:
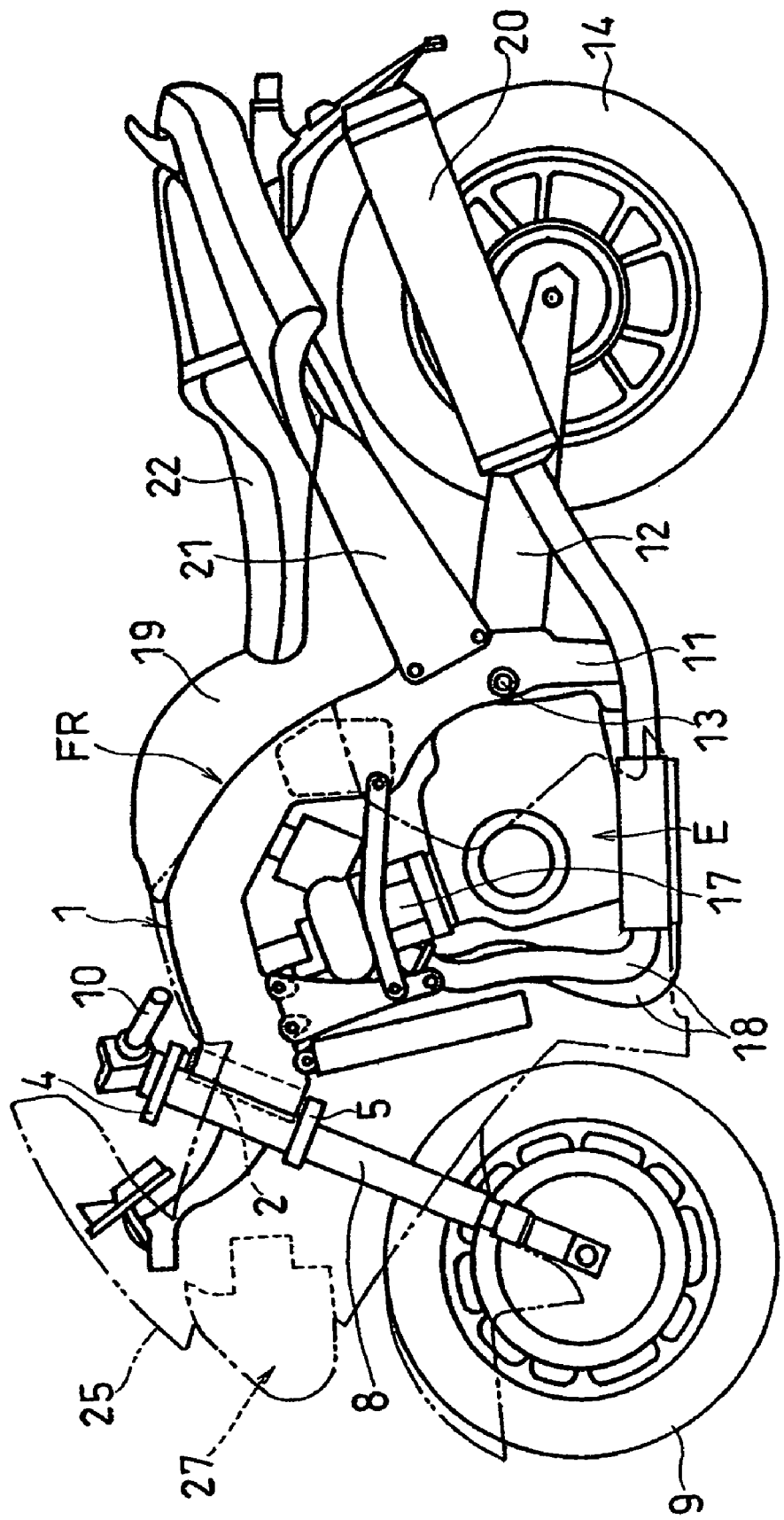
FIG. 1 is a side view of a motorcycle equipped with a headlight assembly according to a preferred embodiment of the present invention.

FIG. 1 illustrates a side view of a motorcycle that is equipped with a headlight assembly according to the preferred embodiment of the present invention. As shown therein, the motorcycle includes a motorcycle frame structure FR made up of a main frame 1, forming a front half of the motorcycle frame structure FR, and a rear frame 21 forming a rear half of the motorcycle frame structure FR and rigidly coupled with a rear portion of the main frame 1 by fastening bolts (not shown).

A head tube 2 is secured to a front portion of the main frame 1. Upper and lower brackets 4 and 5 are supported through a steering shaft (not shown) that is rotatably inserted through the head tube 2. The upper and lower brackets 4 and 5 support front fork members 8, with a front wheel 9 being rotatably supported by respective lower ends of the front fork members 8. A handlebar 10 is mounted on the upper bracket 4 at respective upper ends of the front fork members 8.

The main frame 1 is provided at a rear lower portion with swingarm brackets 11, with which an swingarm 12 is connected through a pivot pin 13 for pivotal movement up and down about the pivot pin 13. This swingarm 12 carries a rear drive wheel 14 rotatably supported by a rear end thereof.

A multi-cylinder type combustion engine E including a cylinder head 17 is supported at a position below an intermediate portion of the main frame 1. A plurality of exhaust tubes 18 are fluidly connected at one end with the cylinder head 17 and are also fluidly connected at the opposite end with exhaust mufflers 20 one positioned on each side of the motorcycle frame structure FR.

A unitary seat 22 having a rider's seat area and a fellow passenger's seat area is mounted on the rear frame 21. A fuel tank 19 is fixedly mounted on an upper portion of the main frame I between the handlebar 10 and the unitary seat 22. A fairing 25 made of a synthetic resin is fixedly mounted on a front portion of the motorcycle frame structure FR to cover a front to side region of the motorcycle frame structure FR, including a front area forwardly of the handlebar 10 and side areas generally laterally of the motorcycle engine E. A headlight assembly 27 is also mounted on the fairing 25.

Figure 2:
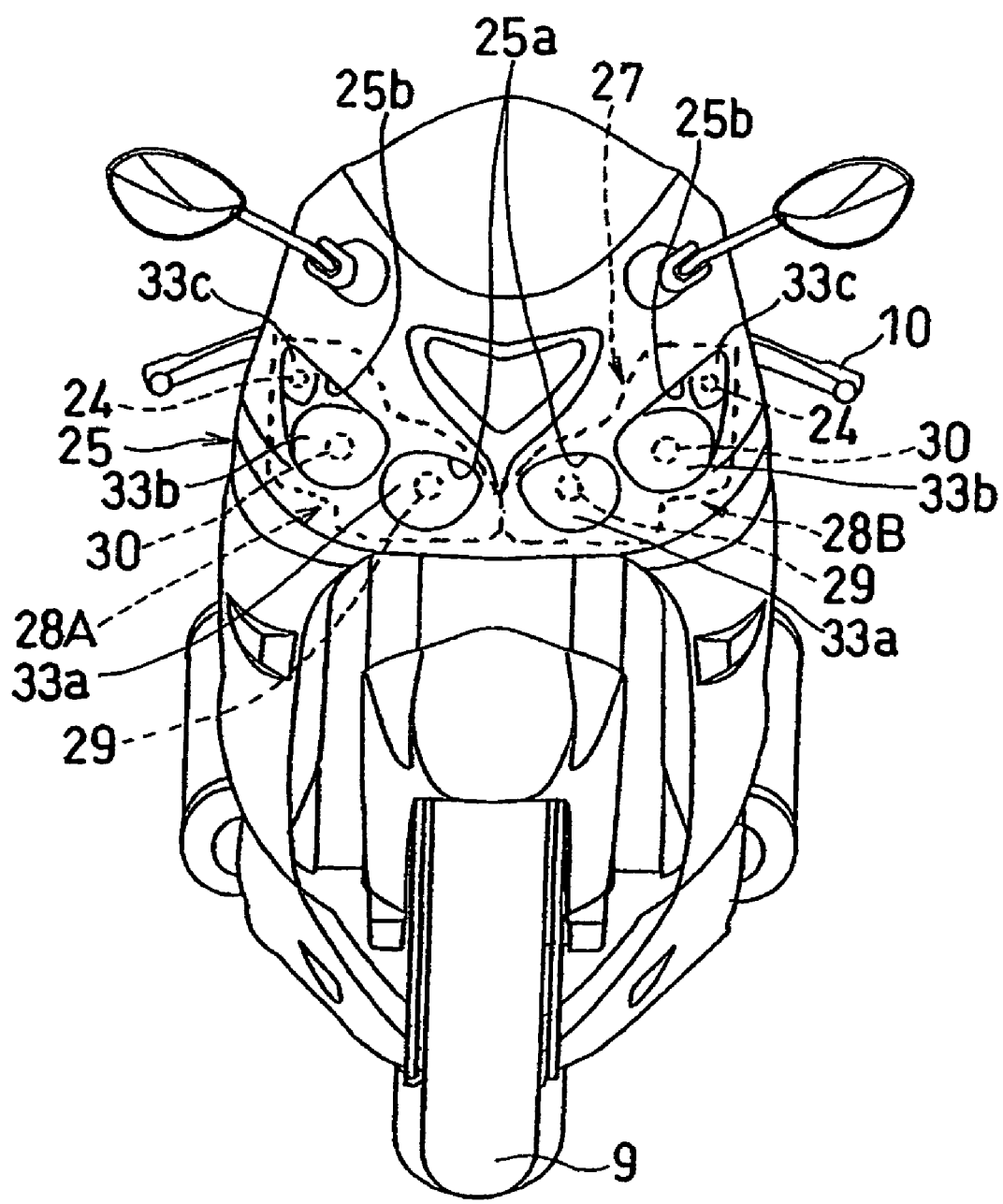
FIG. 2 is a front elevational view of the motorcycle shown in FIG. 1.
Figure 3A:
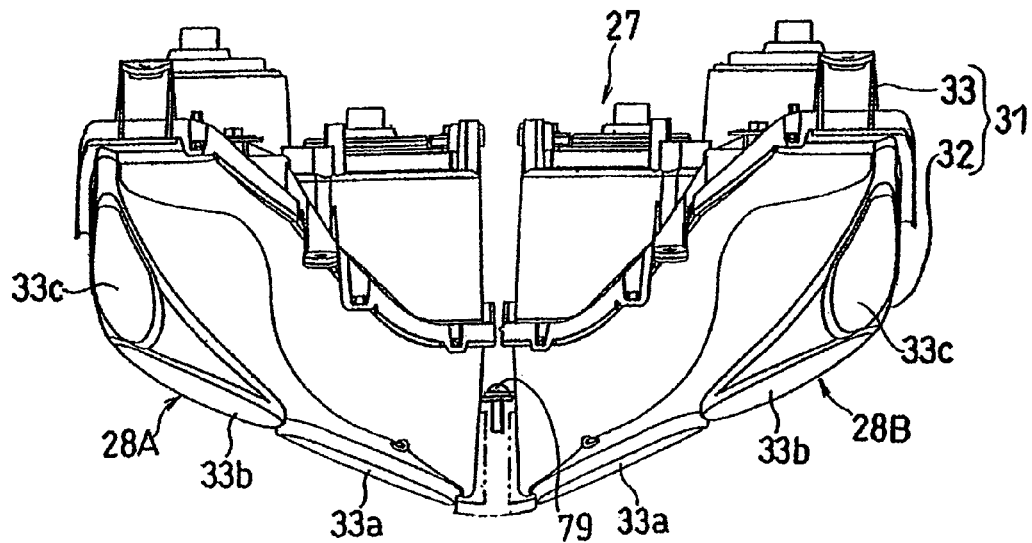
FIG. 3A is a top plan view of the headlight assembly.
Figure 3B:
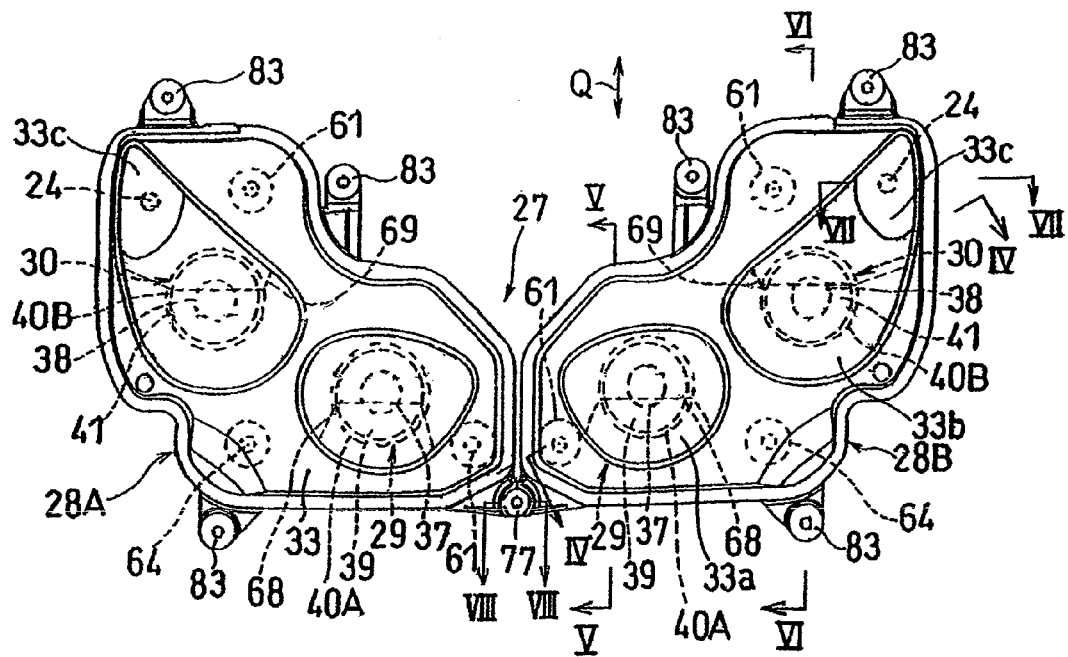
FIG. 3B is a front elevational view of the headlight assembly.

FIG. 2 illustrates a front elevational view of the motorcycle and FIGS. 3A and 3B illustrate top plan and front elevational views of the headlight assembly 27 in a condition removed from the fairing 25. As best shown in FIG. 2, the headlight assembly 27 is of a so-called four light system, including four headlights (light projecting units), and, as best shown in FIG. 3A, is made up of left and right lamp units 28A and 28B connected with each other.

As best shown in FIG. 3B, each of the left and right lamp units 28A and 28B includes a headlight 29 for low beam positioned on a center side and a headlight 30 for high beam positioned on an outer side, and also includes a position lamp 24 located on an outer side of the high beam headlight 30. It is to be noted that the terms "center side" and "outer side" respectively represent regions relatively closer to and remote from the longitudinal symmetry plane of the motorcycle frame structure FR. When viewed from front, the high beam headlight 30 of each of the left and right lamp units 28A and 28B occupies a position displaced diagonally upwardly form the corresponding low beam headlight 29 and the position lamp 24 of each of the left and right lamp units 28A and 28B similarly occupies a position displaced diagonally upwardly from the corresponding high beam headlight 30. The specific manner of connection of the left and right lamp units 28A and 28B will be described in detail later.

The left and right lamp units 28A and 28B have respective configurations and internal structures that are substantially symmetrical and identical with each other. Accordingly, unless otherwise specifically described, only one of the left and right lamp units, the right lamp unit 28B, will now be described in detail for the sake of brevity.

Figure 4:
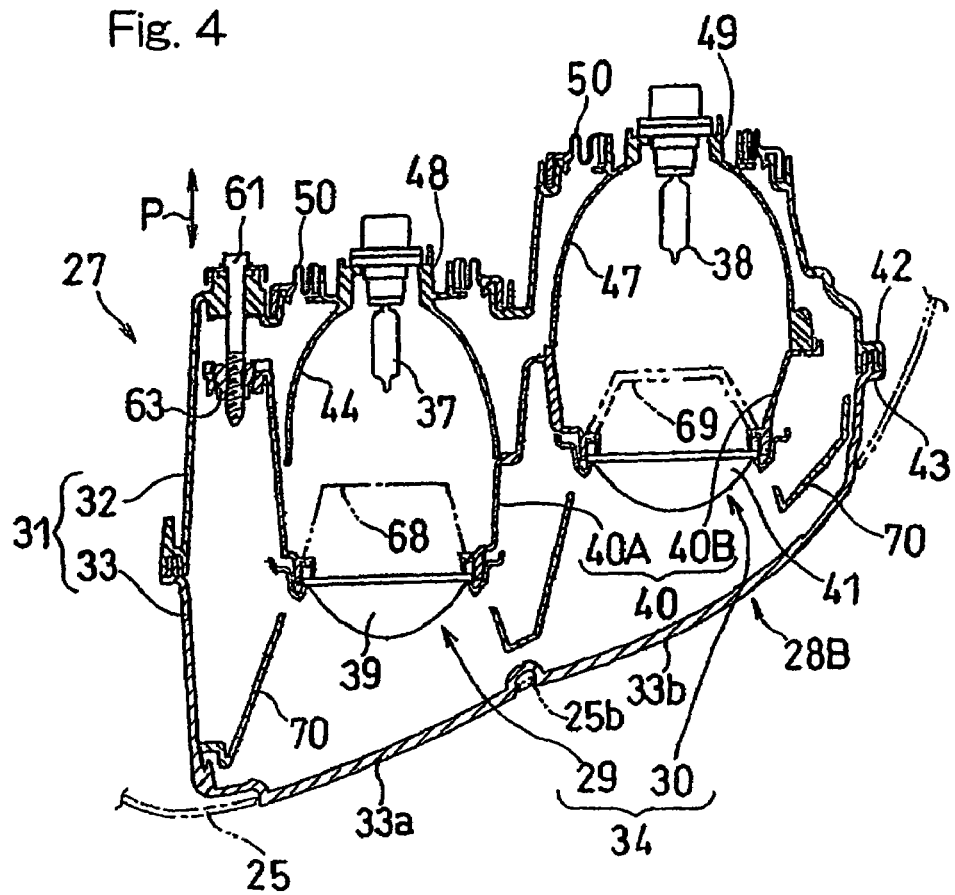
FIG. 4 is a cross-sectional view taken along the line IV-IV in FIG. 3B.

FIG. 4 illustrates a cross-sectional view of the right lamp unit 28B taken along the line IV-IV in FIG. 3B. As shown therein, the lamp unit 28B includes a lamp casing 31 including a body 32, made of a synthetic resin, and a transparent cover 33 made of a transparent synthetic resin and positioned forwardly of and connected with the body 32. The body 32 has a front edge portion formed with a coupling flange 42 and, on the other hand, the cover 33 has a rear edge portion formed with a mating flange 43. The body 32 and the transparent cover 33 are connected to each other with the mating flange 43 engaged in the coupling flange 42, to thereby complete the lamp casing 31. The transparent cover 33 is formed with a center side lens area 33a and a outer side lens area 33b.

Within the lamp casing 31, the center side and outer side headlights (light projecting units) 29 and 30 cooperate to form a single light projecting group 34. The center side headlight 29 is positioned within the lamp casing 31 confronting with the center side lens area 33a of the transparent cover 33 and includes a light emitting element 37 in the form of a bulb, a center side projector lens 39 positioned between the light emitting element 37 and the center side lens area 33a and operable to diffuse, at a predetermined angle of diffusion, a beam from the light emitting element 37 in a direction forwardly of the motorcycle, and a generally tubular support member 40A for supporting the internal projector lens 39 to the body 32.

On the other hand, the outer side headlight 30 is positioned within the lamp casing 31 confronting with the outer side lens area 33b of the transparent cover 33 and includes a light emitting element 38 similarly in the form of a bulb, a outer side projector lens 41 positioned between the light emitting element 38 and the outer side lens area 33b and operable to diffuse, at a predetermined angle of diffusion, a beam from the light emitting element 38 in a direction forwardly of the motorcycle, and a support member 40B for supporting the outer side projector lens 41 to the body 32.

The first and second support members 40A and 40B of the center side and outer side headlights 29 and 30, which are utilized for supporting the first and second internal projector lenses 39 and 41, respectively, cooperatively form a single holder 40 of a unitary construction. This holder 40 is in the form of a casting made of an aluminum alloy. As best shown in FIG. 3B, each of the first and second internal projector lenses 39 and 41 represents, when viewed from front, a round shape and, correspondingly, the respective first or second tubular support member 40A or 40B represents a substantially tubular shape.

The center side and outer side headlights 29 and 30 are provided with respective first and second reflectors 44 and 47 of a generally bowl-like shape each having a center bottom portion thereof formed integrally with a corresponding lamp socket 48 or 49 for supporting the associated light emitting element 37 or 38. Each of the generally bowl shaped reflectors 44 and 47 is in the form of a casting made of an aluminum alloy and has an inner surface vapor-deposited with a light reflective thin film of aluminum. Each of the lamp sockets 48 and 49 is in turn displaceably fitted to the body 32 through a corresponding flexible socket covering 50.

Figure 5:
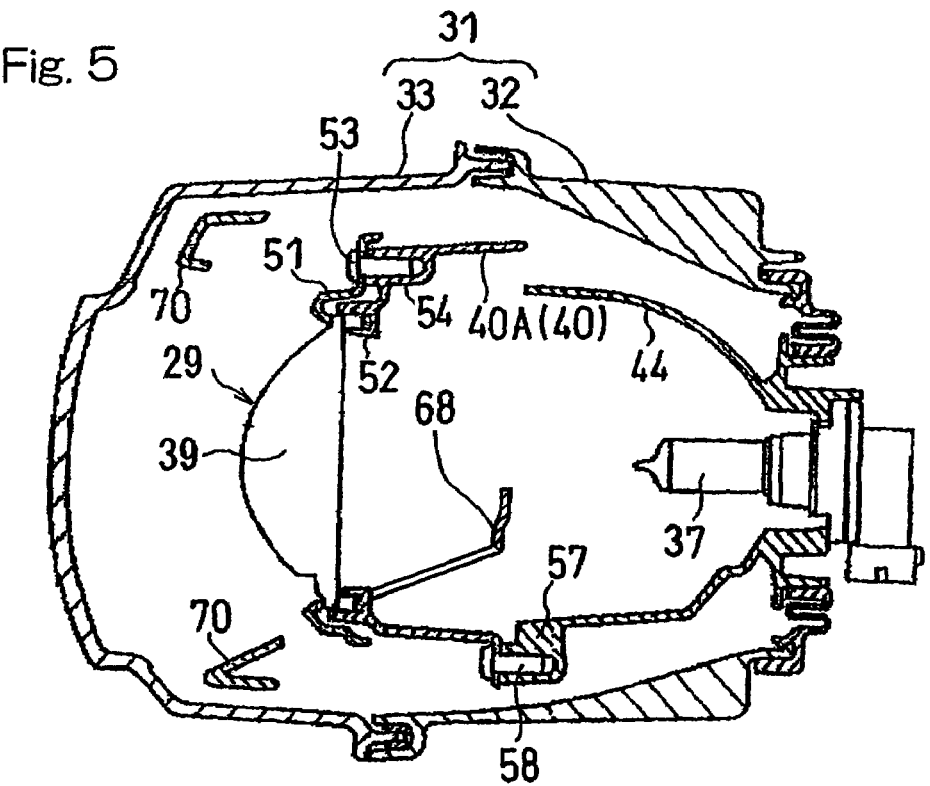
FIG. 5 is a cross-sectional view taken along the line V-V in FIG. 3B.

Referring now to FIG. 5 illustrating a cross-sectional view taken along the line V-V in FIG. 3B, the first support member 40A has a forward end portion formed integrally with an annular seat 52 of a size sufficient to support an outer peripheral portion of the center side projector lens 39. This first support member 40A also has a plurality of, for example, three, bosses 54 formed integrally therewith and circumferentially equidistantly spaced from each other. Each of those bosses 54 has an internally threaded hole defined therein for threadingly receiving a corresponding bolt 53 that has passed through a corresponding insertion hole defined in an ornamental ring 51. Accordingly, the center side projector lens 39 is fixedly supported by the first support member 40A with its peripheral portion sandwiched firmly between the annular seat 52 and the ornamental ring 51 while the bolts 53 passing through the associated insertion holes in the ornamental ring 51 are threaded respectively into the internally threaded holes in the bosses 54.

The first support member 40A of the center side headlight 29 is also formed integrally with a high-beam-shielding member or plate 68 for shielding a higher portion of rays of light, emitted from the associated light emitting element 37, so that the beam from the center side headlight 29 can be narrowed to illuminate a lower area, or a region of the road surface relatively close to the motorcycle. This first support member 40A is fixedly supported by means of a plurality of, for example, three, bolts 58 threaded into respective internally threaded holes defined in a corresponding number of bosses 57 formed integrally with the associated first reflector 44 and spaced circumferentially equidistantly from each other. Each of the bosses 57 formed integrally with the first reflector 44 is so positioned at respective location circumferentially intermediate between the neighboring bosses 54, which is formed integrally with the first support member 40A as described previously, as to facilitate a bolt fastening work.

Figure 6:
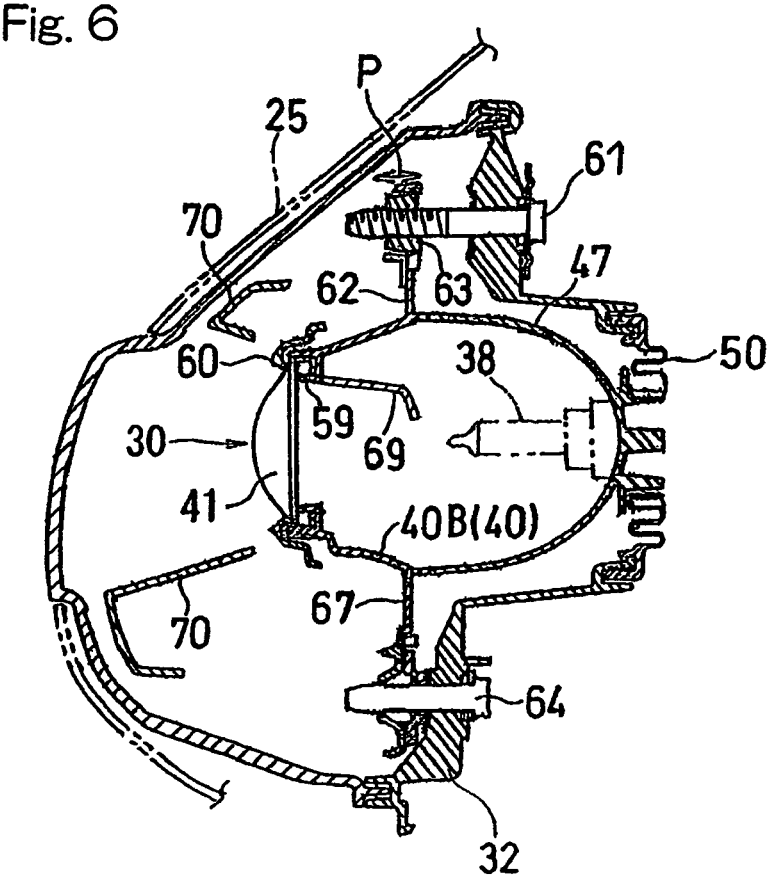
FIG. 6 is a cross-sectional view taken along the line VI-VI in FIG. 3B.

Referring now to FIG. 6 showing a cross-sectional view taken along the line VI-VI in FIG. 3B, the outer side headlight 30 is generally similar in structure to that of the center side headlight 29 specifically shown in and described with reference to FIG. 5. More specifically, as best shown in FIG. 6, the second tubular support member 40B has a forward end portion formed integrally with an annular seat 59 of a size sufficient to support an outer peripheral portion of the outer side projector lens 41. In a manner similar to the first support member 40A, this second tubular support member 40B also has a plurality of, for example, three, bosses (not shown) formed integrally therewith and circumferentially equidistantly spaced from each other. Each of those bosses in the second tubular support member 40B has an internally threaded hole defined therein for threadingly receiving a corresponding bolt (also not shown) that has passed through a corresponding insertion hole defined in an ornamental ring 60. Accordingly, the second internal projector lens 40 is fixedly supported by the second tubular support member 40B with its peripheral portion sandwiched firmly between the annular seat 59 and the ornamental ring 60 while the bolts passing through the associated insertion holes in the ornamental ring 60 are threaded respectively into the internally threaded holes in the bosses.

The second tubular support member 40B of the outer side headlight 30 is also formed integrally with a low-beam-shielding member or plate 69 for shielding a lower portion of rays of light, emitted from the associated light emitting element 38, so that the beam from the outer side headlight 30 can be narrowed to illuminate an upper area, or a region of the road surface further away from the motorcycle.

The body 32 of the lamp casing 31 includes an optical-axis-adjusting bolt 61 adjustably mounted in a portion thereof adjacent the outer side headlight 30. This optical-axis-adjusting bolt 61 has an externally threaded free end engaged adjustably in a nut 63 that is rigidly secured to a support lug 62 formed integrally with the second tubular support member 40B so as to protrude outwardly therefrom. The body 32 also includes a fulcrum pin 64 extending therethrough into the interior of the lamp casing 31, and a support piece 67 formed integrally with the second tubular support member 40B so as to protrude radially outwardly therefrom is tiltably mounted on an inner end portion of the fulcrum pin 64.

It is to be noted that as best shown in FIG. 3B, the optical-axis-adjusting bolt 61 is, in each of the first and second lamp units 28A and 28B, provided at two spaced locations for each of the first and second lamp units 28A and 28B, but the only fulcrum pin 64 is employed for the two optical axis adjusting screws 61.

Thus, it will readily be seen that when the optical adjusting screw 61 shown in FIG. 6 is turned in either direction, the support lug 62 can be moved forward or rearward in a direction, shown by P in FIG. 4, through the nut 63, accompanied by a tilting motion, about the fulcrum pin 64, of the outer side headlight 30, which is displaceably supported by the body 32 and includes the light emitting element 38, the second reflector 47, the second tubular support member 40B and the second projector lens 41. By so doing, the optical axis of the outer side headlight 30 can be adjusted. At this time, the center side headlight 29 is tilted in association with the tilting motion of the outer side headlight 30 to complete the adjustment of the optical axis of the center side headlight 29, since the first support member 40A is formed integrally with the second tubular support member 40B.

The transparent cover 33 is provided with extensions 70 inside thereof and forwardly of the respective projector lenses 39 and 41 for concealing outer peripheral areas of the projector lenses 39 and 41 to thereby enhance aesthetic features of the lamp unit 28A or 28B.

Figure 7:
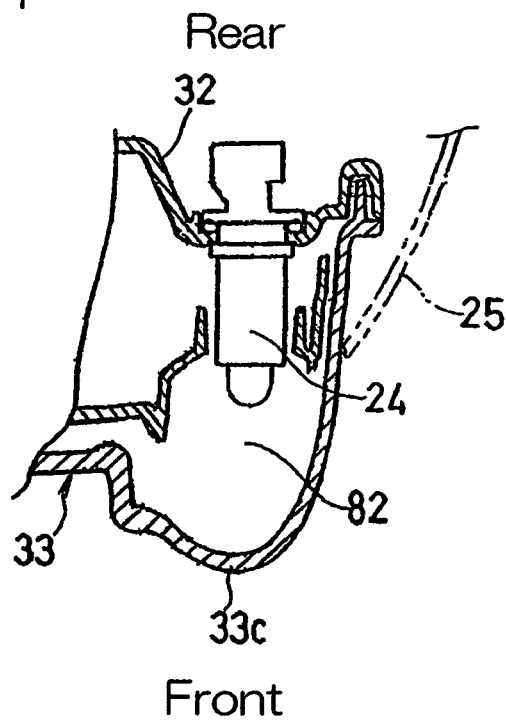
FIG. 7 is a cross-sectional view taken along the line VII-VII in FIG. 3B.

FIG. 7 illustrates a cross-sectional view taken along the line VII-VII in FIG. 3B. As shown therein, an outermost portion of the transparent cover 33 has a position lens area 33c formed therein in alignment with the position lens 24. This position lens area 33c is so shaped as to protrude forwardly and outwardly from the remaining portion of the transparent cover 33 including the center side and outer side lens areas 33a and 33b, so that a gap 82 sufficient to effectively dissipate heat generated by the position lamp 24 can be defined between the position lamp 24 and the position lens area 33c.

Figure 8:
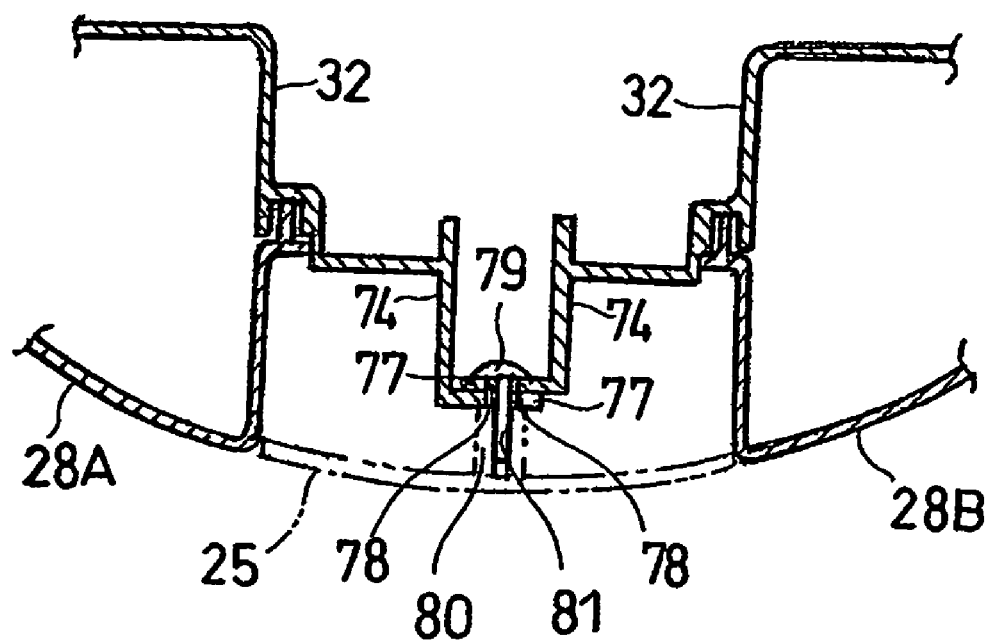
FIG. 8 is a cross-sectional view taken along the line VIII-VIII in FIG. 3B.

While each of the left and right lamp units 28A and 28B as best shown in FIGS. 3B is so structured and so configured as hereinbefore described by way of the right lamp unit 28B, the both are separably connected with each other through coupling pieces 77 and 77 provided at respective portions thereof, which confront with each other and lie at a lower position of a mid-center of the motorcycle. Specifically, as shown in FIG. 8 showing a cross-sectional view taken along the line VIII-VIII in FIG. 3B, those respective portions of the left and right lamp units 28A and 28B, which confront with each other, are formed integrally with coupling arms 74 and 74 so as to protrude therefrom in a direction close towards each other. The coupling pieces 77 and 77 referred to above are formed integrally with those coupling arms 74 and 74 so as to protrude from respective free ends of the coupling arms 74 and 74 in a direction close towards each other a distance enough to allow those coupling pieces 77 and 77 to overlap one above the other and have respective connecting holes 78 and 78 defined therein in alignment with each other.

The left and right lamp units 28A and 28B are connected with each other by means of a set bolt 79 passing through the aligned connecting holes 78 and 78 and threaded into an internally threaded hole 81 defined in a mounting boss 80 that is formed integrally with a front inner portion of the fairing 25. Thus, the coupling pieces 77 and 77 are utilized not only to connect the left and right lamp units 28A and 28B together, but also to connect them with the fairing 25.

For each of the left and right lamp units 28A and 28B, the fairing 25 has two openings or windows 25a and 25b defined therein, as best shown in FIG. 2, so that when the left and right lamp unit 28A and 28B are mounted on the motorcycle, the center side and outer side lens areas 33a and 33b, defined in the transparent cover 33, can be received within and be exposed to the outside through those windows 25a and 25b, respectively. On the other hand, the body 32 of the lamp casing 31 of each lamp unit 28A or 28B has its outer peripheral portion formed with a plurality of, for example, three, mounting lugs 83 for engagement with corresponding mounts (not shown) formed on a back surface of the fairing 25 shown in FIG. 2.

Accordingly, with the center side and outer side lens areas 33a and 33b nested within the associated windows 25a and 25b in the fairing 25, the mounting lugs 83 integral with the lamp casing 31 of each lamp unit 28A and 28B are secured to the associated mounts (not shown) on the back surface of the fairing 25 by means of respective fastening members such as, for example, bolts or set screws.

Thus, it is quite clear that each of the left and right lamp units 28A and 28B shown in FIG. 3B is supported by the fairing 25 through two sets of four joints including a joint between the coupling pieces 74 and 74 and the mounting boss 80 and respective joints between the mounting lugs 83 and the mounts (not shown) on the back surface of the fairing 25.

According to the preferred embodiment of the present invention, since the first and second tubular support members 40A and 40B of the center side and outer side headlights 29 and 30 in each of the left and right lamp units 28A and 28B cooperatively form the single holder 40 as shown in FIG. 4, the single holder 40 can be utilized to support the two headlights 29 and 30 for each of the left and right lamp units 28A and 28B on the respective lamp casing 31 through the optical axis adjusting bolt 61 and the fulcrum pin 64. Accordingly, not only can the assimilability of the respective lamp unit 28A or 28B be increased, but also the number of component parts used can be reduced. Also, since the holder 40 is formed integrally with the light shielding members 68 and 69, the number of component parts used can further be reduced. In addition, the tilting motion of the single holder 40 through an adjustment of the optical adjusting bolt 61 is effective to adjust the respective axes of the center side and outer side headlights 29 and 30 simultaneously, the adjustment of the optical axes of those headlights 29 and 30 can easily be performed.

Also, in each of the left and right lamp units 28A and 28B, since the two headlights 29 and 30 forming the single light projecting group 34 occupy respective positions displaced not only in a vertical direction shown by the arrow-headed line Q as shown in FIG. 3B, but also in a direction substantially parallel to the longitudinal direction P of the motorcycle as shown in FIG. 4, the center side and outer side headlights 29 and 30 can be arranged in proximity to each other. Accordingly, the dimension of the headlight assembly 27 as a whole as measured in the direction perpendicular to the optical axis, for example, the width of the lamp assembly 27 as viewed from front of the motorcycle, can be reduced advantageously to facilitate a compactization of the headlight assembly 27.

The headlight assembly 27 is comprised of the two lamp units 28A and 28B that are separably connected together in the manner described hereinbefore and, accordingly, as compared with the unitary structure of a headlight assembly including a plurality of lamp units formed integrally with each other, each of the lamp units 28A and 28B can have a reduced weight, allowing the individual lamp units 28A and 28B to be handled easily. This leads to increase of the assimilability of the headlight assembly 27. Considering that the headlight assembly 27 makes use of the relatively heavy projector type headlights 29 and 30 each including a projector lamp, the effect of increase of the assimilability resulting from reduction in weight discussed above is indeed prominent.

Furthermore, the left and right lamp units 28A and 28B have the respective coupling pieces 77 and 77 that are connected together by means of the bolt 79 as shown in FIG. 8 and are in turn connected with the fairing 25 with the bolt 79 threaded into the mounting boss 80 as hereinbefore described. Accordingly, the coupling pieces 77 and 77 concurrently serve to position the left and right lamp units 28A and 28B relative to each other and also to connect the both with the fairing 25 and, hence, the number of connecting elements to be provided in the left and right lamp units 28A and 28B for connection with the fairing 25 can advantageously be reduced. In other words, while it is considered that four joints are generally required for each of the lamp units 28A and 28B to be mounted on the motorcycle and, hence, eight joints in total are required, the illustrated embodiment requires only the total number of seven joints including a connection between the coupling pieces 77 and 77. Accordingly, not only can the assimilability be increased, but the space required for those joints can be minimized.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the preferred embodiment of the present invention, the plural headlights (light projecting units) have been shown and described as arranged in side-by-side relation in a direction generally transverse of the motorcycle, the present invention can be equally applied to the headlight assembly including the headlights arranged one above the other in a vertical direction. In such case, if the light projecting units are displaced forward or rearward relative to each other, the vertical dimension of the lamp assembly can be reduced.

Also, other than the motorcycle which has been referred to in the foregoing description, the present invention can be equally applied to a headlight assembly for use in a three- or four-wheeled vehicle.

Accordingly, such changes and modifications are, unless they depart from the scope of the present invention as delivered from the claims annexed hereto, to be construed as included therein.

What is claimed is:

1. A vehicle headlight assembly which comprises:
a casing; and
a light projecting group accommodated within the casing and including a plurality of light projecting units;
each of the light projecting units including a light emitting element, a projector lens, a reflector for reflecting a light beam emitted from the light emitting element towards the projector lens and a support member supported by and within the casing and operable to support the projector lens;
the support members of those light projecting units cooperatively forming a single holder.

2. The vehicle headlight assembly as claimed in claim 1, wherein the light projecting units forming the light projecting group are arranged displaced relative to each other in a direction along an optical axis.

3. The vehicle headlight assembly as claimed in claim 1, further comprising a light shielding member for partially shielding a cone of rays of light projected from the light emitting element to adjust an area to be illuminated, the light shielding member being formed integrally with the single holder.

4. The vehicle headlight assembly as claimed in claim 1, further comprising first and second lamp units connected with each other and wherein the light projecting group is provided within each of the first and second lamp units.

5. The vehicle headlight assembly as claimed in claim 1 wherein the integrally formed support members are adjustably mounted to the casing by an optical axis adjusting member and a fulcrum pin that enables rotation of the support members.

6. The vehicle headlight assembly as claimed in claim 1 wherein the transparent cover includes aesthetic extensions spaced adjacent the light projecting units and configured with sufficient off-set space to enable relative adjustment of the support members.

7. The vehicle headlight assembly as claimed in claim 4 wherein the first and second lamp units are mechanically and integrally connected with each other.

8. The vehicle headlight assembly as claimed in claim 1 wherein the single holder includes a pair of annular lens seats to mount a respective lens to each light projecting unit.

9. The vehicle headlight assembly as claimed in claim 1 wherein a pair of casings have integrally formed coupling arms that overlap when connected mechanically with each other.

10. The vehicle headlight assembly as claimed in claim 1 wherein each lamp unit includes an integral support member that is shared with two spaced light projecting units to provide respectively a high and a low light beam and a pair of casings for holding the lamp projecting units have integrally formed coupling arms that overlap when mounted on a fairing.

11. The vehicle headlight assembly as claimed in claim 10 where each of the two spaced light projecting units include reflectors that are connected to a flexible socket covering.

12. The vehicle headlight assembly as claimed in claim 1, wherein the single holder is configured in the form of a unitary component, made by means of casting, including a plurality of support members and support portions provided therein through which the single holder is supported by the casing.

13. A vehicle headlight assembly which comprises:
a casing; and
a light projecting group accommodated within the casing and including a plurality of light projecting units,
each of the light projecting units including
a light emitting element for emitting a light beam,
a reflector for reflecting a light beam, emitted from the light emitting element, in a direction towards a focal point, supporting the light emitting element,
a projector lens for refracting the light beam traveling forwardly from the focal point, and
a support member supported by and within the casing and operable to support the projector lens and the reflector;
wherein respective reflectors of the plural light projecting units are positioned spacedly from each other, and
wherein the support members of those light projecting units are coupled with each other to cooperatively form a single holder.

14. The vehicle headlight assembly as claimed in claim 13, wherein the reflector is radially positioned inside the support member of the holder and the single holder is provided with a support lug protruding radially outwardly therefrom, and is supported by the casing through a bolt secured to the casing and threadingly engaging the support lug.

15. The vehicle headlight assembly as claimed in claim 13, wherein the reflector is radially positioned inside the support member of the holder and the support member of the holder is provided with a support lug protruding radially outwardly therefrom for threadingly receiving an optical-axis-adjusting bolt secured to the casing and a support piece protruding radially outwardly therefrom for tiltably receiving a fulcrum pin secured to the casing, and wherein the holder is supported by the casing through both of the optical-axis-adjusting bolt and the fulcrum pin so that the holder is operable to tilt relative to the casing on the fulcrum pin by threadingly adjusting a position of the support lug relative to the optical-axis-adjusting bolt.

16. The vehicle headlight assembly as claimed in claim 13, wherein the support member is formed integrally with a plurality of projector lens supporting bosses circumferentially equidistantly spaced from each other and supports the projector lens through a plurality of bolts respectively threaded into corresponding insertion holes defined in the projector lens supporting bosses, and is further formed integrally with a plurality of reflector supporting bosses circumferentially equidistantly spaced from each other and supports the reflector through a plurality of bolts respectively threaded into corresponding insertion holes defined in the reflector supporting bosses, each of the projector lens supporting bosses being circumferentially positioned between the reflector supporting bosses.

17. The vehicle headlight assembly as claimed in claim 13, wherein the holder is in the form of casting made of an aluminum alloy and has a tubular portion that connects the projector lens and the reflector.

18. The vehicle headlight assembly as claimed in claim 13, wherein the holder is employed in the form of a unitary component, made by means of casting, including a plurality of support members and support portions provided therein through which the holder is supported by the casing.

19. The vehicle headlight assembly as claimed in claim 13, wherein the light projecting group includes a light projecting unit for low bean and a light projecting unit for high beam, the light projecting unit for low beam having a support member integrally formed with a high-beam-shielding member for shielding a higher portion of rays of light emitted from the associated light emitting element, and the light projecting unit for high beam hawing a support member integrally formed with a low-beam-shielding member for shielding a lower portion of rays of light emitted from the associated light emitting element and wherein those support members formed with respective shielding members cooperatively form the single holder.

20. The vehicle headlight assembly as claimed in claim 19, wherein the single holder is configured in the form of a unitary component, made by means of casting, including a plurality of support members and the high and low-beam shielding members.

* * * * *

UNITED STATES PATENT AND TRADEMARK OFFICE
CERTIFICATE OF CORRECTION

PATENT NO. : 7,628,517 B2  Page 1 of 1
APPLICATION NO. : 11/520151
DATED : December 8, 2009
INVENTOR(S) : Domoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 113 days.

Signed and Sealed this

Second Day of November, 2010

David J. Kappos
*Director of the United States Patent and Trademark Office*